(12) United States Patent
Santos

(10) Patent No.: US 8,315,719 B2
(45) Date of Patent: Nov. 20, 2012

(54) DECENTRALIZED SYSTEM AND ARCHITECTURE FOR REMOTE REAL TIME MONITORING OF POWER TRANSFORMERS, REACTORS, CIRCUIT BREAKERS, INSTRUMENT TRANSFORMERS, DISCONNECT SWITCHES AND SIMILAR HIGH VOLTAGE EQUIPMENT FOR POWER PLANTS AND ELECTRIC POWER SUBSTATIONS

(76) Inventor: Eduardo Pedrosa Santos, Atibaia (BR)

( * ) Notice: Subject to any disclaimer, the term of this patent is extended or adjusted under 35 U.S.C. 154(b) by 233 days.

(21) Appl. No.: 12/649,699

(22) Filed: Dec. 30, 2009

(65) Prior Publication Data

US 2011/0160922 A1 Jun. 30, 2011

(51) Int. Cl.
- G05B 9/02 (2006.01)
- G05B 19/18 (2006.01)
- G05B 11/01 (2006.01)
- G06F 11/00 (2006.01)
- G06F 7/00 (2006.01)
- G06F 17/00 (2006.01)
- G06F 12/00 (2006.01)
- G06F 13/28 (2006.01)
- G06F 11/16 (2006.01)
- G06F 11/30 (2006.01)
- G21C 17/00 (2006.01)

(52) U.S. Cl. ............ 700/82; 700/2; 700/22; 702/183; 702/188; 707/610; 707/640; 707/674; 711/162; 714/6.3; 714/12; 714/13

(58) Field of Classification Search .......... 700/22, 700/286, 292, 293, 297, 298, 2, 79, 82; 702/57–62, 702/117, 188, 183; 709/217–219, 223, 224; 707/609, 610, 640, 674; 711/100, 154, 161, 711/162; 714/100, 1–3, 6.1, 6.2, 6.3, 6.31, 714/6.32, 10–13
See application file for complete search history.

(56) References Cited

U.S. PATENT DOCUMENTS

| | | | | |
|---|---|---|---|---|
| 5,963,734 A * | 10/1999 | Ackerman et al. | ............. | 703/18 |
| 6,535,797 B1 * | 3/2003 | Bowles et al. | ............. | 700/286 |
| 6,611,773 B2 * | 8/2003 | Przydatek et al. | ............. | 702/62 |
| 6,957,158 B1 * | 10/2005 | Hancock et al. | ............. | 702/61 |
| 7,336,065 B1 * | 2/2008 | Hyatt et al. | ............. | 324/142 |
| 7,558,703 B2 * | 7/2009 | Stoupis et al. | ............. | 702/183 |
| 7,630,863 B2 * | 12/2009 | Zweigle et al. | ............. | 702/188 |
| 7,870,595 B2 * | 1/2011 | Finney et al. | ............. | 726/1 |
| 8,124,003 B2 * | 2/2012 | MacArthur et al. | ............. | 266/99 |
| 2006/0117295 A1 * | 6/2006 | Wu et al. | ............. | 717/104 |

(Continued)

OTHER PUBLICATIONS

Jung, Thierry et al., "Implementation of new monitoring tools and optimisation of maintenance through the use of Web-based technology", IEEE/PES Transmission & Distribution Conference & Exposition: Latin America, pp. 902-907 (Nov. 8-11, 2004).

(Continued)

*Primary Examiner* — Crystal J Barnes-Bullock
(74) *Attorney, Agent, or Firm* — McKee, Voorhees & Sease, P.L.C.

(57) ABSTRACT

"DECENTRALIZED SYSTEM AND ARCHITECTURE FOR REMOTE REAL TIME MONITORING OF POWER TRANSFORMERS, REACTORS, CIRCUIT BREAKERS, INSTRUMENT TRANSFORMERS, DISCONNECT SWITCHES AND SIMILAR HIGH VOLTAGE EQUIPMENT FOR POWER PLANTS AND ELECTRIC POWER SUBSTATIONS", remarkably consisting of intelligent sensors of the IED type that make concerning measurements in the high voltage equipment, interconnected through a communication network to a monitoring central computer, allowing user's remote access to the measurements and diagnosis of the equipment condition as well as emitting automatic alarms should any abnormality appear in it.

11 Claims, 2 Drawing Sheets

U.S. PATENT DOCUMENTS

| | | | |
|---|---|---|---|
| 2008/0077336 A1* | 3/2008 | Fernandes | 702/57 |
| 2008/0086222 A1* | 4/2008 | Kagan | 700/22 |
| 2008/0103631 A1* | 5/2008 | Koliwad et al. | 700/286 |
| 2010/0204948 A1* | 8/2010 | Kirrmann et al. | 702/117 |
| 2010/0256832 A1* | 10/2010 | Kirrmann et al. | 700/293 |
| 2011/0257806 A1* | 10/2011 | Werner et al. | 700/292 |
| 2012/0010831 A1* | 1/2012 | Kagan | 702/60 |

OTHER PUBLICATIONS de Motta, Orlando J. Michel, et al., "Experiencia de furnas em sistemas de monitoramento para equipamentos de energia electrica", Tema 1—Automacao E Digitalizacao De Usinas, Subestacoes E Redes De Distribuicao (Sep. 12-13, 2007).

Scaquetti, David, et al., "Sistemas de monitoramento on-line aplicados aos diversos segmentos do sistema electrico", Brasil (Oct. 14-17, 2007).

Alves, Marcos E.G., et al., "Specification of On-line Monitoring Systems for Power Transformers Based on a Decentralized Architecture", Cigre International Technical Colloquium, Rio de Janeiro, Brazil (May 11-14, 2003).

Alves, Marcos E.G., "On-Line Monitoring of 345-138/13.8kV 150MVA Auto-Transformer Bank With on Load Tap Changes", SNPTEE National Seminar on Production and Transmission of Electrical Power, Rio de Janeiro, Brazil (Aug. 9-14, 2009).

* cited by examiner

DECENTRALIZED SYSTEM AND ARCHITECTURE FOR REMOTE REAL TIME MONITORING OF POWER TRANSFORMERS, REACTORS, CIRCUIT BREAKERS, INSTRUMENT TRANSFORMERS, DISCONNECT SWITCHES AND SIMILAR HIGH VOLTAGE EQUIPMENT FOR POWER PLANTS AND ELECTRIC POWER SUBSTATIONS

BRIEF SUMMARY OF THE INVENTION

The present requisition contemplates a patent requisition of an unpublished original "DECENTRALIZED SYSTEM AND ARCHITECTURE FOR REMOTE REAL TIME MONITORING OF POWER TRANSFORMERS, REACTORS, CIRCUIT BREAKERS, INSTRUMENT TRANSFORMERS, DISCONNECT SWITCHES AND SIMILAR HIGH VOLTAGE EQUIPMENT FOR POWER PLANTS AND ELECTRIC POWER SUBSTATIONS"; remarkably of a system able to perform the monitoring in real time of all high voltage equipment installed in power plants and/or in electric power substations, which means a great number of devices that may yield hundreds or thousands, with no need of a large number of remote computers to process the information and without incurring in processing overload in the small number of computers assigned for such task. Such system results from a simplified architecture and presents several advantages on the state of art, to be described in this report.

INTRODUCTION

High voltage devices, such as power transformers, reactors, circuit breakers, disconnect switches, current transformers, potential transformers, surge arresters, voltage regulators, etc. are largely used in generation, transmission and distribution systems of medium, high as well as extra-high voltage, performing vital duties to assure power supply continuity as well as quality.

This way, power generation, transmission and distribution reliability directly depends upon such devices reliability and upon their good condition. Indeed, failures occurring in such equipment may provoke power lack to a neighborhood, to a city or even to a region as well as "domino effect" disconnections that may culminate in blackout of a state or of a country.

Besides, power authority regulation states, in most countries, heavy financial penalties to the power distributors in cases of equipment disconnection, generally greater in case of sudden disconnections, such as happens when a defect occurs in equipment, which culminates with its failure. Also, in power intensive industries, that use a large number of high voltage devices to supply power to their production processes, these equipment disconnections may provoke production reductions or even temporary production cessation, with great financial losses.

From the presented scenario, a proper maintenance of the mentioned high voltage equipment has an important role in their reliability as well as in that of the systems where they are inserted into. Such need has naturally led to the appearing of a maintenance engineering specialization and to a progress of the practices it had hitherto adopted, so that the historically settled corrective maintenance philosophy (only made after the machine failure) has been substituted by the preventive one (programmed halts for checking and repairs). It, however, ended to become evident that such preventive maintenance philosophy, although representing an important improvement compared to the corrective one, also has its inconvenient, such as, for instance, a) many unnecessary halts made only to find out that there was no need of any maintenance, b) previously inexistent problems inadvertently inserted in a machine when doing its maintenance or, yet, c) the unexpected equipment failure when a defect appears and grows up in the period between two preventive maintenance operations.

Maintenance engineering, as a consequence, has once more advanced with the appearance of the Condition Based Maintenance (CBM) or maintenance based upon the equipment condition. Such philosophy aims to determining the state or condition of an equipment during its operation while operating, by mean of measurements and diagnostic methods, so that equipment halt and maintenance are made only if really necessary and not simply based on previously determined operation periods. Concurrently, the methodology called "Reliability Centered Maintenance" (RCM) was developed, that aims at giving priority to maintenance activities in accordance with their respective importance for the process as a whole, which finds in the predictive maintenance a natural complement.

STATE OF THE ART

Predictive maintenance and RCM philosophies, as well as the consequent need of knowing the equipment condition, has led to the appearance of a new tool, represented by the on-line monitoring systems, which aim at diagnosing, automatically and in real time, the condition of the equipment, by processing data from sensors therein installed, also able to appoint condition evolution prognosis and to suggest, in some cases, actions that maintenance staff could apply, if any. Examples of on-line monitoring systems applied to power transformers may be seen in U.S. Pat. No. 4,654,806.

In the current state of art, the real time condition monitoring systems for high voltage equipment, such as power transformers, reactors, circuit breakers, disconnect switches and others are usually composed of several sensors installed at the equipment to measure several magnitudes related to its state and operation conditions as well. Beyond the elements sensitive to the magnitude which measurement is desired, such sensors are also constituted of electronic circuits, used to generate sensor's output signal, which may be analogical (e.g., a current signal of 4 to 20 mA proportional to the measured magnitude), digital (signalizing or alarm contacts) or serial communication ports (RS485, RS232 or other for instance).

From this point on, state of art monitoring systems form themselves in two different classes, in accordance with the employed architecture: centralized architecture systems and decentralized or distributed architecture systems.

In the centralized architecture systems, as those shown in U.S. Pat. No. 6,906,630, sensors outputs connect to an information centralizing device, usually a Programmable Logic Controller (PLC), also installed at the high voltage equipment or close to it.

The centralizing device reads, therefore, sensors' output signals, be them analogical ones, digital ones or of serial communication ports, so that all various measurements information collected by the sensors in the high voltage equipment may be obtained. In some cases, the centralizing device may do some basic information processing such as, for instance, the Apparent Power calculation starting from voltage and current information as well as similar others, as shown in U.S. Pat. No. 6,906,630.

Following, all information proceeding from the sensors and from the local pre-processing are transmitted to a remote computer, located in a place of adequate environment, usually the substation or power plant control room, with air conditioning, or an office of the electric power utility. Several ways may be used for the information transmission from the centralizing element to such computer, such as optic fibers, radio links, telephone line, Intranet and Internet, among others.

In the decentralized systems there is no centralizing device. IED (Intelligent Electronic Device) type sensors are used, which have digital electronic circuits and are equipped with serial communication ports, that are employed in direct transmission of measurements data to the remote computer, usually located in the substation or power plant control room or in an office of the electric power utility, working, from this point on, similarly to the centralized architecture. For such purpose, IED sensors communication ports are interconnected to form a data communication network that may use different ways to transmit sensors' information to the remote computer, such as optic fibers, radio links, telephone line, Intranet and Internet, among others.

Then, inside the remote computer, the real time monitoring software is executed, computing all various sensors data. Such processing consists in mathematic models as well as algorithms that cross one or more sensors measurement data in real time, besides data and parameters informed by the user, to obtain useful information for the high voltage equipment condition diagnosis, such as a transformer percent loss of as a function of temperature and humidity, water content in insulating paper as a function of moisture in oil, among others. In some systems, some of such calculations may be also done in the centralizing device (PLC), as per U.S. Pat. No. 6,906,630 should this architecture be used, supplying a data pre-processing.

With such mentioned calculations results as well with sensors' measurements, the monitoring system may issue alarms when programmed limits are surpassed as well for sensors' measurements as for mathematical models and algorithms.

Some monitoring systems in state of art have performed in their monitoring software, in the remote computer, an Expert System, an Artificial Intelligence technique where a logic rules system is employed reflecting a human expert knowledge, so that in an alarm case, for instance, the Expert System checks the validity of several hypothesis aiming at finding those that may comply with the rules of a particular scenario. This way, a monitoring system is able to issue, besides the mentioned alarm, a diagnosis of the probable reason for the alarm occurrence, as well as to suggest corrective recommended actions and appoint the evolution prognosis of the detected situation should those corrective action be not performed.

The monitoring software also periodically saves sensors' measurements as well as the data processing results in data banks, which stores equipment operation conditions history all along its life. Based on such history, the monitoring system may also calculate the evolution trend of the condition of the equipment and generate prognosis of its future condition.

To allow users' access to the monitoring systems data, all its computers distributed in the substations and power plants are interconnected to a network, usually company's Intranet or Internet, each computer having an interface that allows remote access to its data through mentioned networks. Such interface consists, in general, of pages in Internet format, for instance, in HTML language or other employed in the World Wide Web. This way, any computer connected to the utility Intranet or to Internet, depending upon the case, provided they have a web browser installed, is able to connect to the monitoring system and to visualize in real time the sensors' measurements, the data processing results, the diagnosis, prognosis and recommended actions, if applicable, as well as the measurements and historical data saved in the system's data bank.

The monitoring systems of the state of the art may be also equipped with mechanisms for an automatic issuing of alert messages either should an alarm occur or should an abnormal condition in the high voltage equipment be detected. Such messages are usually sent either in the Internet's electronic mail format (e-mail) or in a text message for mobile phones (SMS or MMS), taking into consideration the previously filed electronic addresses or mobile telephone numbers into the monitoring system.

Some monitoring systems of the state of the art use a computer for each high voltage equipment to be monitored, while others use one computer for all equipment of a same type (transformer, reactor, etc.) in the same substation or power plant. Once an electric power utility may possess hundreds of substations, with hundreds or thousands pieces of high voltage equipment, the condition monitoring of all equipment in real time requires, in the state of the art, the use of a large number of computers and monitoring softwares. This provokes a high acquisition and installation cost of such systems as well as the need of a maintenance staff only to keep in operation hundreds or thousands of computers, including the monitoring hardware and software, as well as hundreds or thousands of centralizing devices (PLCs), should the centralized architecture be used.

It is not uncommon, in the electric power utilities routine, a high voltage equipment, a transformer for instance, to have to be relocated, removed from a substation or a power plant and reinstalled in another one. In this case, the whole data acquisition system, PLCs as well as computers there included, must be displaced or, at least, procedures that require technicians and specialized systems as well must be used for the data of the relocated transformer to be transferred to another computer in the new installation, what may provoke several practical problems, such as: special cares for the transportation of individual computers centralizing equipment historical data, possible accidents with such computers during their removal, either in the transportation or in the new facilities, that may lead to partial or total loss of the data collected for years, jeopardizing the transformer life history and, consequently, the whole transformer's maintenance program.

A possible alternative to such arrangement could be the use of one only computer for the monitoring of every high voltage equipment in the electric power utility, located at its central office, for instance, and receiving data from all IED type sensors or centralized devices distributed in its substations and high voltage equipment. Due to the great number of high voltage equipment to monitor in an electric power utility, hundreds or thousands, and, consequently, to the even greater number of sensors which measurements must be collected, processed and saved in a data bank by the monitoring system, such alternative presents several problems, such as a great computational load, that may require special computers with high installation and maintenance costs, plus the dependency from one only computer for the whole system operation, so that, in case of problems in this machine, all high voltage equipments would not be monitored. The obvious alternative to by-pass such reliability problem, that would be the use of two or more computers operating in a redundant manner for the monitoring system, also suffers from the firstly presented inconvenience, that is, the high cost of a necessarily very high performance computer, which is then multiplied by the number of computers used in the redundant system.

STATE OF ART DISADVANTAGES

The centralizing device (PLC) leads to an increase of the system's acquisition and installation cost, in a centralized architecture case;

The centralizing device (PLC) represents an additional point of potential failure of the monitoring system, in a centralized architecture case, with the aggravating circumstance that the PLCs are, in general, devices designed to be used in industrial environments, not in power substations, where extreme environmental temperatures as well as electromagnetic interferences are found, which lead to a great number of failures;

The high acquisition costs of a large number of computers, operational systems licenses as well as monitoring systems licenses, beside these devices and softwares installation costs in hundreds of substations spread over great geographic areas attended by the electric power concessionaries, to allow the monitoring of their whole number of high voltage equipment;

The high maintenance costs of the monitoring systems, possibly leading to the need of a maintenance team specially dedicated to keep in operation hundreds or thousands of computers in hundreds of substations spread over wide geographical areas, their hardwares, operational systems and monitoring softwares there included;

Even higher monitoring systems maintenance costs, and a more pressing need of a specially dedicated maintenance team, should the centralized architecture be used, taking into consideration the mission of keeping in operation the hundreds or thousands of centralizing devices (PLCs) dispersed in hundreds of substations in wide geographical areas;

The need of displacing the whole data collecting system, PLCs as well as computers there included, in case of high voltage equipment relocation into a new substation, or, at least, the performance of procedures that require technicians and specialized systems to transfer relocated equipment data to another computer in the new facilities, with accident risks in computers when being removed, either in their transportation or in the new facilities, that may provoke total or partial loss of the data collected for years, jeopardizing the transformer life history and, consequently, of the whole transformer maintenance program;

The high installation and maintenance costs of special computers, of a very high processing power, should an option be made of using one only central computer for the monitoring of the whole number of the utility high voltage equipment, aggravated by the need of a highly specialized workmanship for such tasks;

The low reliability of the monitoring system, should an option be made of using one only central computer to monitor the whole number of high voltage equipments, once such computer failure could provoke all the equipment to be simultaneously without any monitoring;

The high necessary investment to by-pass the above mentioned low reliability, with the duplication of a mentioned high performance special computer aiming at obtaining a redundant configuration.

ABOUT THE INVENTION

Being aware of the state of art, its inconveniences and limitations, the inventor, active person in this particular area, after many studies and researches, has created the focused "DECENTRALIZED SYSTEM AND ARCHITECTURE FOR REMOTE REAL TIME MONITORING OF POWER TRANSFORMERS, REACTORS, CIRCUIT BREAKERS, INSTRUMENT TRANSFORMERS, DISCONNECT SWITCHES AND SIMILAR HIGH VOLTAGE EQUIPMENT FOR POWER PLANTS AND ELECTRIC POWER SUBSTATIONS", that aims at making the real time condition monitoring of high voltage equipment used in substations and power plants more reliable and at reducing its costs, compensating the current deficiencies on what concerns the inconveniences fully illustrated in the state of art.

INVENTION'S ADVANTAGES

The use of centralizing devices (PLCs) in high voltage equipment is eliminated, reducing monitoring system acquisition and installation costs;

Additional points of potential failures are eliminated due to avoiding installing centralizing devices, more over considering that such devices are, in general, designed to be used in industrial environments and not in electric power substations, where extreme ambient temperatures and electromagnetic interferences are found, that lead them to a high level of failures;

Centralizing devices (PLCs) maintenance costs are eliminated in the monitoring systems, that would be dispersed in hundreds of substations in great geographic areas;

Acquisition costs of a large number of computers, operational systems licenses as well as monitoring systems softwares are avoided, besides the installation costs of such devices and softwares in hundreds of substations spread over the wide areas attended by the electric power concessionaries, once the proposed system and its architecture allow monitoring all high voltage equipments of an electric power utility with no need of computers in the substations and power plants;

Monitoring system's computers maintenance costs are reduced, for one only central computer is used instead of hundreds or thousands of computers in hundreds of substations spread over great geographic areas, each one with its own hardware, operational system and monitoring software, that would require maintenance;

Although using one only central computer for the monitoring of hundreds pieces of high voltage equipment, very high processing power and high installation and maintenance costs special computers use is avoided, allowing the use of common commercial computers for such task, of relatively low cost;

Although using one only computer for all high voltage equipment monitoring, the monitoring system's reliability is kept at a high level, due to the fact that the intelligent sensors perform in an autonomous and distributed manner several of the tasks the system needs, even in a case of failure of the central computer;

Due to the autonomy of the intelligent sensors of the new system now presented, loss of important data for high voltage equipment condition monitoring is avoided in case of a failure in the communication network or even in the central computer;

Users' access to data as well as to monitoring system information is allowed even in case of failure of the central computer, increasing the availability of the monitoring system;

Internal redundancy of data banks used to file made measurements is permitted, allowing the sensors to restore data occasionally lost in the central computer or this to restore data occasionally lost in the sensors;

Due to the relatively low cost of the central monitoring computer applied, the use of two or more central computers operating in redundant manner, becomes economically possible, to obtain yet greater reliability;

Depending upon user's specific monitoring needs as well as upon his network's features, it allows a complete monitoring system computers use elimination, there included the central computer;

Should a high voltage equipment need to be relocated from a substation to another, there shall be no need for any data acquisition equipment relocation, since the sensors are directly installed at the high voltage equipment and are automatically transferred together with it. When arriving to the new substation, it will suffice to reconnect the sensors to the communication network, for them to become accessible to the users and automatically to be recognized by the central computer. This way, the equipment history is preserved and continued, no matter its geographic location change.

BRIEF DESCRIPTION OF THE DRAWINGS

Following, the invention is explained on what concerns the attached drawings, where, in an illustrative but not limitative manner, are shown.

DETAILED DESCRIPTION OF THE INVENTION

Figure 1:
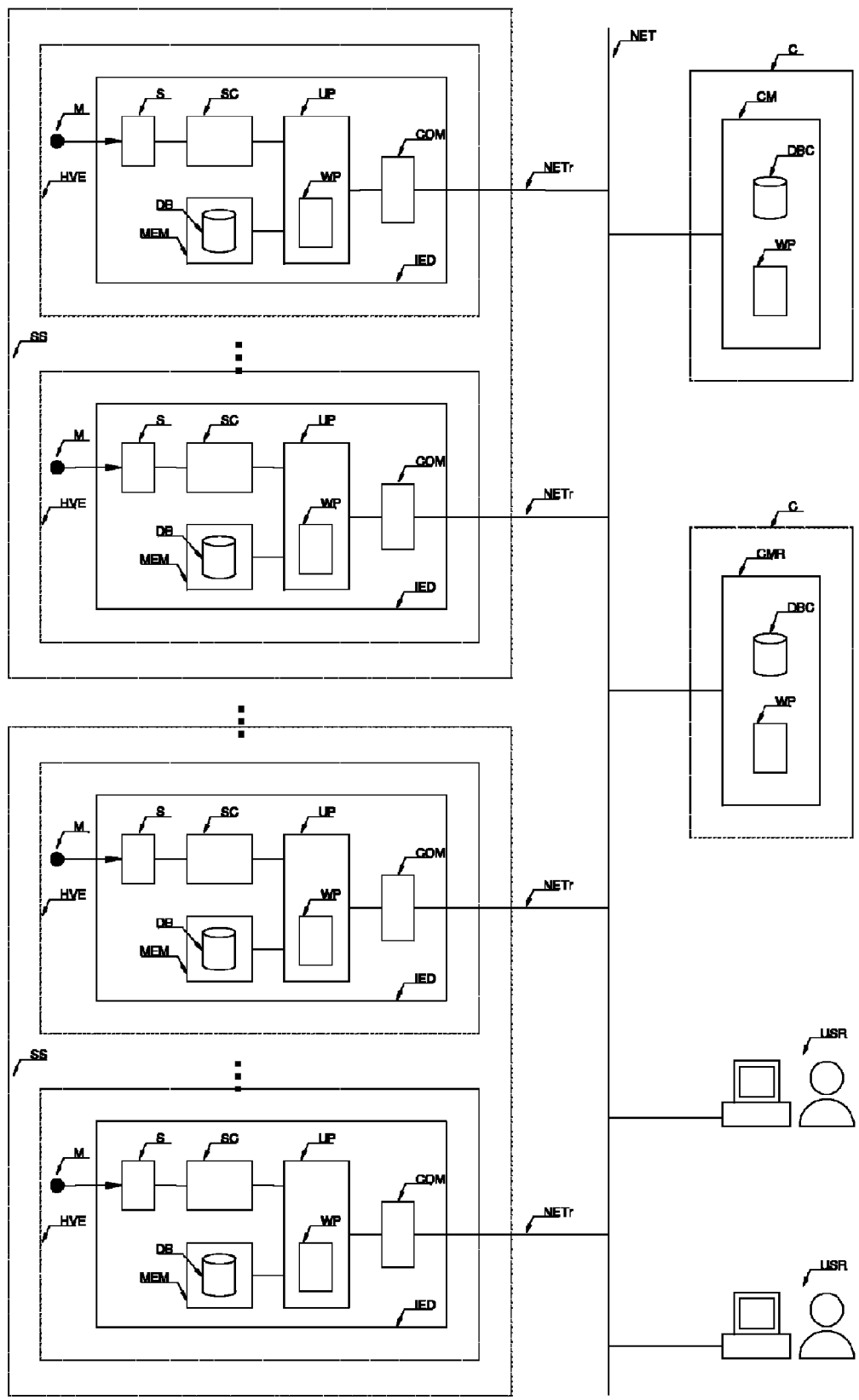
FIG. 1: Schematic diagram of the invented system.
Figure 2:
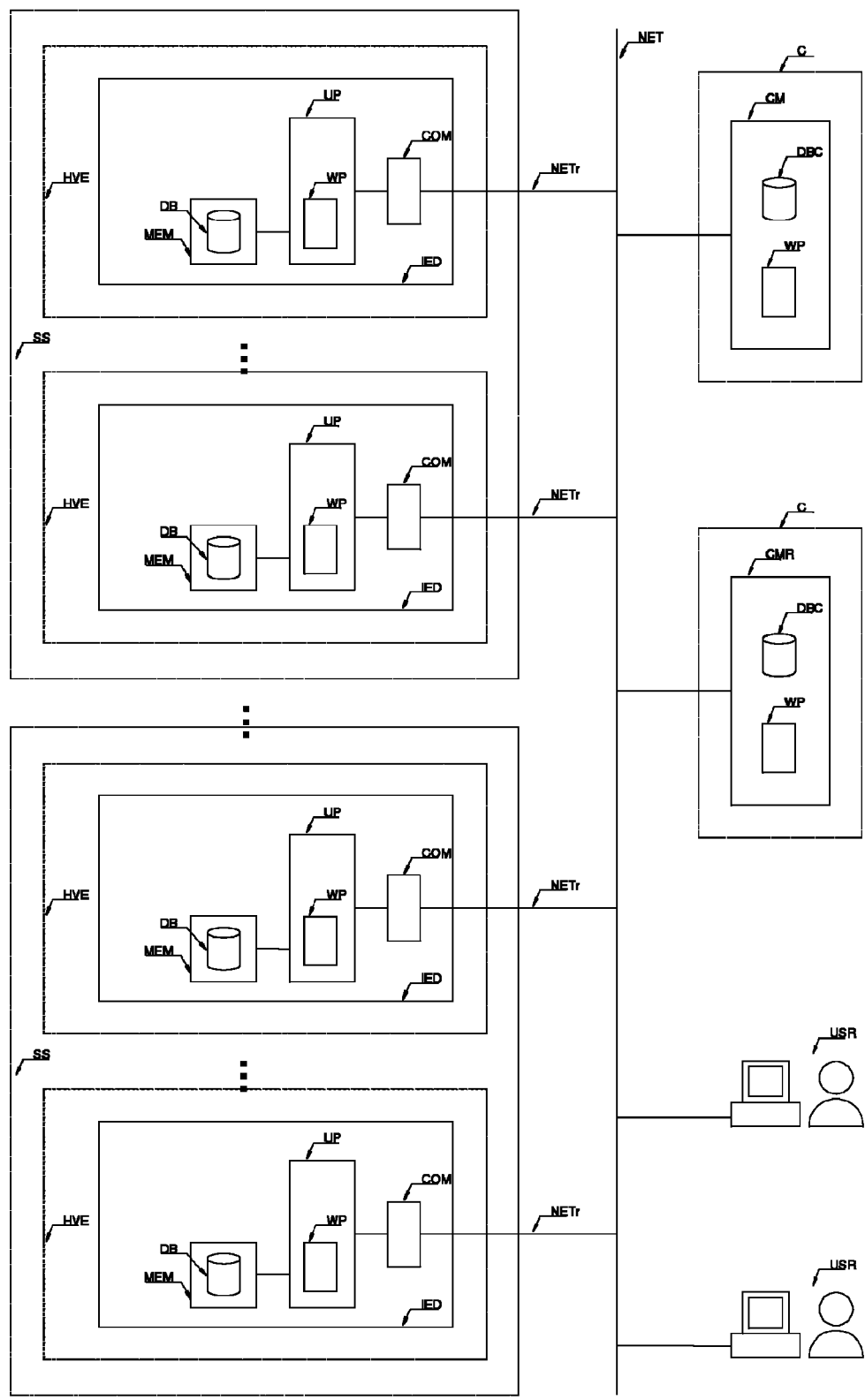
FIG. 2: Illustrative view of the invented architecture.

"DECENTRALIZED SYSTEM AND ARCHITECTURE FOR REMOTE REAL TIME MONITORING OF POWER TRANSFORMERS, REACTORS, CIRCUIT BREAKERS, INSTRUMENT TRANSFORMERS, DISCONNECT SWITCHES AND SIMILAR HIGH VOLTAGE EQUIPMENT FOR POWER PLANTS AND ELECTRIC POWER SUBSTATIONS", mainly consists of IED type intelligent sensors which perform significant measures in high voltage equipment installed in several electric power substations and power plants and are endowed of mathematical internal processing for the procurement of useful information to diagnose the condition, of data bank for information filing, of remote man-machine interface by mean of Internet pages and communication circuits as well—interconnected by a communication network to a monitoring central computer, this also endowed of data bank and man-machine interface by Internet pages, allowing user's remote access to the interface pages of the monitoring system, as well in the sensor as in the central computer, through the same communication net.

More particularly, the here described monitoring system is composed of intelligent sensors (IED), installed in several high voltage equipment (HVE) present in a large number of electric power substations or power plants (SS), which measure through their sensor elements (S) and signal conditioning electronic circuits (SC) as well several variable measurements (M) during high voltage equipment (HVE) operation, yet been able to process its own measurements, together with all other sensors (IED) measurements, in its microprocessor (UP), in order to obtain useful information for the diagnosis of the condition of the high voltage equipment (HVE), such processing being from now on referred as Engineering Models. Such sensors (IED) have also a data bank software (DB) executed by their microprocessor (UP), to file as well the measurements made as the Engineering Models information, being the data bank information saved inside the sensor (IED) in the non-volatile memory (MEM), for them not to be lost in a case of (IED) sensor power supply failure. The data bank (DB) may obey to any data bank commercially available standard, as, just as an example, the SQL standard.

Sensors (IED) have yet communication interfaces (COM) that allow their connection to a data communication network (NET), through which they interchange measurements and information among sensors (IED). Through such communication interface (COM) as well as through the network (NET), that interconnects the various substations (SS) among them and with the central place (C), the sensors (IED) communicate with the central monitoring computer (CM), informing it the measurements figures as well as the results of the in real time processing. The central computer (CM) has also a central data bank (DBC), which data are kept synchronized with those of the data banks (DB) placed in the sensors (IED) every time the computer (CM) may have a chance to communicate with the sensors (IED). Should, by any reason, an interruption happen in such communication, the sensors (IED) shall continue to save data in their local data bank (DB), so that no loss of information may occur; as soon as the communication between sensor (IED) and computer (CM) should be restored, the synchronism between the data bank (DB) and the central data banks (DBC) will automatically be initiated, copying the data of the bank (DB) to the central data bank (DBC), such copy encompassing only those data that are in the data bank (DB) but are not in the central data bank (DBC), to avoid a communication network (NET) overloading. The described system also effectively avoids data to be lost in a case of failure or interruption in the central computer (CM) operation, for, during the time where it will be unavailable, the sensor (IED) shall continue, in an autonomous manner, to make measurements in the high voltage equipment (HVE), to process such measurements with the Engineering Models, and to save the measurements and the Engineering Models results in the data bank (DB) as well, being such data copied to the central data bank (DBC) as soon as the central computer (CM) operation should be restored.

In the exceptional case of a defect and substitution of one of the sensor (IED), the synchronism process of the data bank may be done in an opposite way, i.e., automatically copying the data of the central data bank (DBC) to the local data bank (DB) of the new sensor (IED) as soon as should this be connected to the net (NET) and should be informed by the user, when setting the parameters of the new sensor (IED), which defective sensor (IED) it is substituting and to which high voltage equipment it is associated to. Therefore, the sensors (IED) and the central computer (CM) operate in a collaborating and complementary manner, working as a reciprocated safety copy—or backup—in both directions.

On the other hand, the sensors (IED) cost restrictions lead to the tendency to their non-volatile memory (MEM) to be able to file in the data bank (DB) a relatively short period of time, some weeks, months or a little more, for instance, being true that, after having fully filled the memory (MEM), the oldest data shall start to be overwritten, i.e., erased and substituted by the recently obtained measurements. This way, the central data bank (DBC) in the central computer (CM) works as a register of long term historical data, being able to encompass the whole useful life of the high voltage equipment (HVE), while the data banks (DB) in the sensors (IED) work as short and medium term registers.

In order to allow the users (USR) connected to the communication network (NET) to access to the data and information of the monitoring system, the sensors (IED) and the central computer as well use, as man-machine interfaces, pages of Internet format (WP) as, for instance, HTML type, hosted as well in the sensors (IED) as in the central computer (CM), allowing to visualizing in real time as well the measurements and Engineering Models data as those registered in the data bank (DB), filed into the non-volatile memory (MEM). In ordinary monitoring system operation situations, the users (USR) may access the pages (WP) hosted in the central computer, avoiding, therefore, an excessive data traffic in the network (NET) ramifications (NETr) that lead to the sensors (IED), many times installed in distant places and, therefore, with restricted speed in such ramifications, mainly when many users (USR) simultaneously connect to the monitoring system. However, in the case of a failure of the central computer (CM), the users (USR) may directly visualize the pages (WP) hosted in the sensors (IED), even with some restriction to the number of users that may simultaneously access them, avoiding, therefore, the monitoring system of all high voltage equipment to be unavailable due to the failure of one only of its components, the central computer (CM).

Attention must be called to the fact that the described system as well as its peculiar architecture allow the use of a common commercial equipment as central computer (CM), with no special need of a high processing power, for all measurements calculations and processing by the Engineering Models, in order to obtain useful information for maintenance, are made in the local sensors (IED), as well as the recordings in data banks (DB), only remaining to central computer (CM) the task of making one only copy of the data already available in the sensors (IED) and make it available to the users. This way, the central computer (CM) tends to become a relatively low cost equipment, and even allows the use of a redundant configuration, where one or more additional central computers (CMR), identical to the main central computer (CM), work in parallel with this one, for the failure of any of the central computers (CM, CMR) do not interrupt the others' operation, so that the central data bank (DBC) and the interface pages as well (WP) are kept in operation and available for the user's (USR) access in the central computers (CM, CMR) still in operation.

In an extreme case, the data banks (DB) and the interface pages as well embedded in the sensors (IED) may even allow the whole elimination of the central computers (CM, CMR), would the communication network (NET) features allow it and should the user have no need of maintaining a data bank larger than the storing capacity of the sensor's (IED) local memory (MEM), so that no computer will remain in the monitoring system, be it either in the substations (SS) or in the central place (C).

The central place (C), where the central computers (CM, CMR) are installed may relate with different locations or facilities, there included the electric power utility offices, the Data Processing Centre of the utility, its operation or maintenance centers or even an IDC (Internet Data Center) outside the utility facilities, there included the use of central computers (CM, CMR) rented from the IDC to be used in the monitoring system.

In the utility Data Processing Centre option, the Central computers (CM, CMR) may be operating in the same environment where the corporative management systems work, such as the company's ERP system, therefore using a highly reliable computing environment and hierarchically superior, considering that the ERP systems are largely used to manage all company's operational and administrative areas.

The proposed monitoring system and its architecture also allows each central computer (CM, CMR) to be installed in a different central place (C), as, for instance, a central computer (CM) placed in an outside IDC and another central computer (CMR) in the utility Data Processing Centre, far from the first one, so that the risk of data loss in consequence of fires, flood, or other events is reduced.

Only to mention some examples and with no pretension at all of exhausting all possibilities, the communication network (NET) may be constituted of one or by the combination of several existing data transmission options, such as the electric power utility Intranet network, the Internet, the GPRS, EDGE, 3G or others that may use data transmission services from mobile telephony network, telephone lines either dedicated or dialed, satellite data transmission, Wi-fi, Wimax or Zigbee wireless networks, optical fibers, etc.

It must be pointed out that the described monitoring system, as well as its architecture, may allow small variations, with no alteration in the typical features that characterize the invention herewith presented.

What is claimed is:

1. A decentralized system for remote real time monitoring of power transformers, reactors, circuit breakers, instrument transformers, disconnect switches and similar high voltage equipment for power plants and electric power substations, comprising:

intelligent sensors (IED), installed in high voltage equipment present in a plurality of electric power substations or power plants (SS), the power substations including sensor elements (S) and electronic signals conditioning circuits (SC), to measure several variables (M) during high voltage equipment (HVE) operation, being yet able to execute Engineering Models in a microprocessor (UP) using each power substation's (SS) own measurements together with all other sensors (IED) measurements;

wherein the sensors (IED) having a data bank software (DB), executed by each power station's microprocessor (UP), for a continuous storage of the measurements performed as well as of the Engineering Models results, being the data bank data (DB) saved in the non-volatile memory (MEM);

wherein the sensors (IED) having communication interfaces (COM), that connect to a data communication network (NET), through the data communication network (NET) performing the interchange of measurements and Engineering Models results between sensors (IED) and establishing a communication with the central monitoring computer (CM), informing the central monitoring computer (CM) the measurements figures as well as the Engineering Models results in real time;

wherein the central computer (CM) has a central data bank (DBC) which is kept synchronized with the data banks (DB) placed in the sensors (IED) whenever the computer (CM) could be able to communicate with the sensors (IED), and in case of interruption in communications or in computer's (CM) operation, the synchronism between the data banks (DB) and central data banks (DBC) is automatically reinitiated as soon as the communication is recovered, copying from the data bank (DB) to the central data bank (DBC) only the data that are in the bank (DB) and that are not in the central data bank (DBC);

wherein synchronizing, in a case of a sensor (IED) substitution, the data bank in the reverse sense by automatically copying the data in the central data bank (DBC) to the local data bank of the new sensor (IED);

wherein the fact that the sensors (IED) as well as the central computer (CM) host pages (WP) in internet format, used as remote man-machine interfaces, allowing users' (USR) access, through the communication network (NET), to real time measurements and Engineering Models data as well as data registered in the data bank (DB) as well as in the central data bank (DBC);

wherein the system allows the use of a redundant configuration, where one or more additional central computers (CMR), identical to the main central computer (CM), operate in parallel with each other, so that a failure of any of central computers (CM, CMR) will not interrupt the operation of all the others and that the central data bank (DBC) as well as the interface pages (WP) are kept in operation and available for the user's (USR) access in the central computers (CM, CMR) still operating.

2. The decentralized system for remote real time monitoring of power transformers, reactors, circuit breakers, instrument transformers, disconnect switches and similar high voltage equipment for power plants and electric power substations; according to claim 1, wherein the communication network (NET) interconnects all the sensors (IED) present in a same substation (SS) as well as in different substations (SS), also interconnecting the sensors (IED) with the central computer (CM) in the central place (C) as well as with the users (USR), being that the communication net (NET) may be constituted either of one or of a combination of several data transmission options, such as the electric power utility's Intranet network, the Internet, the data transmission services GPRS, EDGE, 3G or others that use mobile telephony network, telephone lines dialed or dedicated, satellite data transmission, Wi-fi, Wimax or Zigbee wireless networks as well as optic fibers.

3. The decentralized system for remote real time monitoring of power transformers, reactors, circuit breakers, instrument transformers, disconnect switches and similar high voltage equipment for power plants and electric power substations, according to claim 1, wherein the sensors (IED) and the central computer (CM) work in a cooperating and complementary manner, with the sensor (IED) acting as a backup copy of the data in the central computer (CM) and the central computer (CM) acting as a back-up copy of data in the sensors (IED).

4. The decentralized system for remote real time monitoring of power transformers, reactors, circuit breakers, instrument transformers, disconnect switches and similar high voltage equipment for power plants and electric power substations, according to claims 1, 2 or 3, wherein, in ordinary operating conditions, the users (USR) may access the pages (WP) hosted in the central computer (CM) and that, in a case of a failure of the central computer (CM) the users (USR) may access the pages (WP) hosted in the sensors (IED).

5. The decentralized system for remote real time monitoring of power transformers, reactors, circuit breakers, instrument transformers, disconnect switches and similar high voltage equipment for power plants and electric power substations, according to claim 1, wherein the central data bank (DBC) in the central computer (CM) may act as a register of a long term historical data as well as from the fact that the data bank (DB) in the sensors (IED) may act as registers of short and medium term, being the data bank (DB) as well as the central data banks (DBC) able to obey to any of the commercially available data bank standards.

6. The decentralized system for remote real time monitoring of power transformers, reactors, circuit breakers, instrument transformers, disconnect switches and similar high voltage equipment for power plants and electric power substations, according to claim 1, wherein the central place (C) where the central computers (CM, CMR) are installed, may relate with the electric power utility offices, with the same utility's data processing centre, with the same utility's operation or maintenance centers or with an IDC (Internet Data Center) outside of the utility facilities.

7. The decentralized system for remote real time monitoring of power transformers, reactors, circuit breakers, instrument transformers, disconnect switches and similar high voltage equipment for power plants and electric power substations, according to claim 1, wherein the proposed monitoring system also allows that each one of the central computers (CM, CMR) may be installed in different central places (C), far one from another.

8. The decentralized system for remote real time monitoring of power transformers, reactors, circuit breakers, instrument transformers, disconnect switches and similar high voltage equipment for power plants and electric power substations, according to claim 1, wherein comprehends the intelligent sensors (IED) of high voltage equipments (HVE) and power plants (SS) that, besides performing the appropriate engineering models, have communication interfaces (COM) that connect to a data communication network (NET), which sets a communication up among all the sensors (IED) in all substations (SS) as well as sets a communication up between the sensors (IED) and the monitoring central computer (CM); wherein the central computer (CM) has a central data bank (DBC) which is kept synchronized with the data banks (DB) placed into the sensors (IED); wherein the sensors (IED) as well as the central computer (CM) host pages (WP) in internet format, used as remote man-machine interfaces, allowing users' (USR) access, through the communication network (NET), to real time measurements and Engineering Models data as well as data registered in the data bank (DB) as well as in the central data bank (DBC); wherein the system allows using a redundant configuration, where one or more additional central computers (CMR) work in parallel with the central computer (CM), so that the system is kept in operation and the user's access to the central data bank (DBC) as well as to the interface page (WP) is allowed in a case of failure of any of the central computers (CM, CMR).

9. The decentralized system for remote real time monitoring of power transformers, reactors, circuit breakers, instrument transformers, disconnect switches and similar high voltage equipment for power plants and electric power substations, according to claim 8, wherein, in ordinary operating situations, the users (USR) may access the pages (WP) hosted in the central computer (CM) and that in a case of failure of the central computer (CM) the users (USR) may access the pages (WP) hosted in the sensors (IED).

10. The decentralized system for remote real time monitoring of power transformers, reactors, circuit breakers, instrument transformers, disconnect switches and similar high voltage equipment for power plants and electric power substations, according to claim 8, wherein the central place (C), where the central computers (CM, CMR) are installed, is allowed to relate with the electric power utility offices, with same utility's data processing centers, with the same utility's operation or maintenance centers or with an IDC (Internet Data Center) outside the utility facilities, also allowing each one of central computers (CM, CMR) to be installed in different central places (C), far one from another.

11. The decentralized system for remote real time monitoring of power transformers, reactors, circuit breakers, instrument transformers, disconnect switches and similar high voltage equipment for power plants and electric power substations, according to claim 8, wherein the monitoring system includes only of the sensors (IED) with the data bank (DB) as well as the interface pages (WP) embedded.

\* \* \* \* \*